United States Patent
Ebi

(10) Patent No.: US 8,503,018 B2
(45) Date of Patent: Aug. 6, 2013

(54) IMAGE FORMING APPARATUS AND METHOD, AND APPARATUS FOR SETTING OPERATION CONDITIONS OF FUNCTIONAL UNIT

(75) Inventor: Yukari Ebi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 357 days.

(21) Appl. No.: 12/909,457

(22) Filed: Oct. 21, 2010

(65) Prior Publication Data

US 2011/0096348 A1    Apr. 28, 2011

(30) Foreign Application Priority Data

Oct. 22, 2009 (JP) ................. 2009-243058

(51) Int. Cl.
*G06F 15/00* (2006.01)
(52) U.S. Cl.
USPC ........................................... 358/1.15
(58) Field of Classification Search
USPC ................................. 358/1.14, 1.13
See application file for complete search history.

(56) References Cited

U.S. PATENT DOCUMENTS

2007/0124516 A1* 5/2007 Ohara et al. ............... 710/62
2009/0195820 A1  8/2009 Sugimoto et al.

FOREIGN PATENT DOCUMENTS

| JP | 2-58068 | 2/1990 |
|---|---|---|
| JP | 6350757 | 12/1994 |
| JP | 11-024511 A | 1/1999 |
| JP | 2004234195 | 8/2004 |
| JP | 2005309618 | 11/2005 |
| JP | 2005347904 | 12/2005 |
| JP | 2006-039470 A | 2/2006 |
| JP | 2007-079382 A | 3/2007 |
| JP | 2007164655 | 6/2007 |
| JP | 2009-188628 | 8/2009 |

* cited by examiner

*Primary Examiner* — Saeid Ebrahimi Dehkordy
(74) *Attorney, Agent, or Firm* — Edwards Wildman Palmer LLP; David G. Conlin; George W. Neuner

(57) ABSTRACT

An image forming apparatus includes: an image forming unit forming an image on a medium based on image data; a first storage storing image forming conditions; an input device storing image forming conditions set by a user input setting the image forming conditions in the first storage; a second storage storing a history of input operations by the user; a registering device registering, if the history stored in the second storage satisfies a predetermined condition, the image forming conditions stored in the first storage as image forming conditions that can be called by a unique identifier; and a calling device, responsive to a user input designating an identifier, the corresponding image forming conditions from the registering device and storing in the first storage.

19 Claims, 12 Drawing Sheets

FIG. 7

| | CONDITION No. | CONTENTS |
|---|---|---|
| BASIC REGISTRATION CONDITIONS | (1) | ITEM ON OR BELOW N-TH LAYER IS SET |
| | (2) | PRESCRIBED NUMBER OR MORE DEFAULT VALUES ARE CHANGED |
| | (3) | SETTING OF 2 OR MORE ITEMS OF SUB MENUS BELOW DIFFERENT ITEMS OF M-TH LAYER IS CHANGED |
| | (4) | ACTUAL NUMBER OF OPERATION STEPS > NUMBER OF OPERATION STEPS TYPICALLY REQUIRED |
| | (5) | SETTING OF ITEMS INVOLVED PAGE TRANSITION |
| COLLATERAL REGISTRATION CONDITIONS | (A) | WHEN SETTING IS CHANGED AND COPY JOB IS DONE WHILEDOCUMENT IS NOT CHANGED, ONLY THE LAST SETTING IS REGISTERED AS JOB PROGRAM |
| | (B) | WHEN ONE USER EXECUTED PLURALITY OF COPY JOBS, LET THE USER SELECT SETTING TO BE REGISTERED AS JOB PROGRAM |

IMAGE FORMING APPARATUS AND METHOD, AND APPARATUS FOR SETTING OPERATION CONDITIONS OF FUNCTIONAL UNIT

CROSS-REFERENCE TO RELATED APPLICATION

This nonprovisional application claims priority under 35 U.S.C. §119(a) on Patent Application No. 2009-243058 filed in Japan on Oct. 22, 2009, the entire contents of which are hereby incorporated by reference.

BACKGROUND OF THE INVENTION

1. Field of the Invention

The present invention relates to an image forming apparatus allowing easy setting of a function requested by a user from among a large number of functions. More specifically, the present invention relates to an image forming apparatus allowing setting to a desired state with a small number of operations, based on operations made by the user for setting the function.

2. Description of the Background Art

It has become increasingly common to connect an image forming apparatus having a printer function or a copy function to a network, to allow use by a plurality of users. Further, the number of apparatuses having a plurality of basic functions (modes) such as a copy function, a facsimile function (hereinafter "facsimile" may also be denoted as FAX or fax), a network-supported printer function and a scanner function, such as MFPs (multi-function peripherals), is increasing.

In such a multifunction peripheral, each user selects a basic function (mode) and sets, for example, a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. It is increasingly common to combine such functions appropriately for use. By way of example, a user using such a multifunction peripheral (image forming apparatus) inputs image data using a scanner function, performs various image processing operations (such as collective printing) by inputting various inputs through an operation panel (a touch-panel display of about 10-inch size) and prints the processed image on a sheet of recording paper using the printer function. In connection therewith, devices that display thumbnail images or a preview image to enable confirmation of the processed results to support user operation have been known.

Further, devices that save a job program recording a series of user operations and causes execution of the job program when a specific key (for example, ten keys) is pressed, or devices that display operation histories in the form of a menu, so that the same process can be instructed in a simple manner, have been known. Examples of such devices are disclosed in patent documents as specified below. In the following, a process of allocating calling of a job program corresponding to a series of user operations to a specific key will be referred to as a "job program registration."

The job program registration as described above requires registration operations by the user, which operations are rather complicated. Therefore, the job program registration is utilized only by frequent users and not very popular among ordinary users. In view of such a problem, Japanese Patent Laying-Open No. 2006-39470 (hereinafter referred to as "'470 Reference") discloses an image forming apparatus allowing registration of settings such as print conditions, without any special operation for registration.

The image forming apparatus includes: a user setting storage unit storing user settings of various setting values for one or more predetermined setting items related to execution of an image forming job; an automatic storage control unit causing, when an instruction to execute an image forming job is received, the user setting in the user setting storage unit; a selecting unit allowing an operator to select one user setting from among user settings stored in the user setting storage unit; a setting unit setting various setting values included in the user setting selected by the selecting unit in the apparatus; and an image forming job executing unit executing the image forming job.

In the image forming apparatus, when an image forming job is executed, user setting related to the setting items for the image forming job is automatically stored by the apparatus. Thereafter, an operator selects an appropriate user setting from among the user settings stored in the apparatus using the selecting unit, and thereby sets the setting in the apparatus. Therefore, the user setting can be stored in the apparatus without necessitating any complicated manual operations by the operator for storing set values. It is possible for the user to have the user setting stored, without performing complicated registration operations.

Further, Japanese Patent Laying-Open No. 2007-79382 (hereinafter referred to as "'382 Reference") discloses an image forming apparatus in which among various settings that can be set by the user, those that are used frequently are allocated to setting operations by a setting unit in accordance with the manner of use by the user, whereby the setting operation for executing a process can be simplified.

The image forming apparatus has an operation panel, on which a setting registration key for instructing registration of an operation setting, and a setting selection key for instructing calling of a registered setting are provided. When a user uses the image forming apparatus, he/she enters user identification information through the operation panel. The user can set the image forming apparatus to a desired state using the operation panel. After the image forming apparatus is set to the desired state, if the user presses the setting registration key and presses a desired key among the ten keys, the image forming apparatus stores the user identification information and setting of the image forming apparatus at that time in association with each other in a storage.

Assume that the user subsequently uses the image forming apparatus. Consider that the user sets the image forming apparatus to the setting registered previously using the setting registration key. In such a situation, the user presses the setting selection key. Further, the user presses the key that corresponds to the desired setting, among the ten keys. Then, the setting stored in the image forming apparatus in association with the user identification information and the setting corresponding to the key is read. On the operation panel of the image forming apparatus, the set contents are displayed. The user confirms that the set contents are as desired by himself/herself, and then presses an execution key. The image forming apparatus is set in accordance with the read set contents, and an image is printed in accordance with the set contents.

'382 Reference further discloses an image forming apparatus that saves history of used set contents. Based on the history of set contents, the image forming apparatus allocates the set contents to ten keys 0, 1, . . . in order starting from the set contents that has the highest frequency of use. When the user presses the setting selection key and then presses 0 of the ten keys, the set contents used most frequently by the user are displayed on the operation panel. When the user presses 1 of the ten keys, the set contents used second most frequently by the user are displayed on the operation panel. Similarly, by pressing the ten keys up to 9, it is possible for the user to confirm the set contents successively in order, starting from the contents of highest frequency of use. If the user presses the execution key with the desired set contents displayed on the operation panel, the image forming apparatus starts operation in accordance with the set contents.

According to the image forming apparatus, settings that are frequently used by the user are allocated one by one to the ten keys. Therefore, it is highly likely that the user simply needs calling of the setting using the ten keys when the job is to be executed. Printing can be started in a simple manner without necessitating complicated operations by the user for print setting. Since various settings that are used frequently by the user can be allocated to ten keys and registered, the operation for setting the image forming apparatus to a desired state at the time of executing a job can be simplified.

Recent multifunctional peripherals have various and many functions to meet various and many demands of the users. The technique disclosed in '470 Reference or '382 Reference described above is effective if a user using such a multifunctional peripheral repeatedly selects one same function. Specifically, by automatically registering a job program using the technique disclosed in '470 Reference or by displaying job programs registered in accordance with user request with priority given to those used frequently using the technique disclosed in '382 Reference, the number of operations required of the user to set functions can be reduced.

The techniques disclosed in '470 Reference and '382 Reference described above, however, still have room for improvement.

According to the technique disclosed in '470 Reference, used settings are all registered as job programs regardless of the frequency of use. Therefore, it is possible that settings of which frequency of use is very low are also registered. As a result, it is expected that a huge number of job programs are stored in the image forming apparatus. It is necessary for the user to select a desired job program from the huge number of job programs. Particularly, the size of an operation panel is not very large as compared with a monitor screen of a personal computer and, therefore, it is necessary to switch images one after another to display the huge number of job programs. Selection of a job program through such an operation is very troublesome.

In the first embodiment disclosed in '382 Reference, it is necessary for the user to determine whether or not the set contents are to be registered. In the second embodiment, it is necessary to press ten keys successively to display the desired set contents and to confirm the displayed set contents. If the desired set contents are not registered in any of the keys up to the tenth key, it is necessary for the user to again input the contents to be set.

SUMMARY OF THE INVENTION

Therefore, an image forming apparatus that allows easy setting of various and many items on a complicated menu without necessitating troublesome operations by the user has been desired.

The present invention provides an image forming apparatus, including: an image forming unit forming an image on a medium based on image data; a first storage connected to the image forming unit, storing image forming conditions when the image forming unit forms an image; an input device receiving a user input setting the image forming conditions and storing set image forming conditions in the first storage; a second storage connected to the input device, storing a history of input operations by a user using the input device; a registering device, connected to the image forming unit, the first storage and the second storage, responsive to completion of image formation by the image forming unit, for registering, if the history stored in the second storage satisfies a predetermined condition, the image forming conditions stored in the first storage as image forming conditions that can be called by a unique identifier; and a calling device, responsive to a user input designating the identifier, for calling the image forming conditions corresponding to the identifier from the registering device and having the image forming conditions stored in the first storage.

By way of example, if the number of steps of user operations for setting items related to image forming conditions is large, it means that the user operations are troublesome. If the set image forming conditions are registered and the image forming conditions can be set by calling the registered image forming conditions, it would be very convenient for the user. History of user operations for setting items related to image forming conditions is stored. If the stored operation history satisfies a predetermined condition, the history is registered as image forming conditions that can be called by a unique identifier. By the calling device, the image forming conditions can be called subsequently, with a small number of operations. Specifically, only the useful settings can be registered without necessitating troublesome operations for registering job programs. As a result, items on various and many menus of complicated configuration can be set easily, without necessitating troublesome operations by the user.

The predetermined condition may be that any of a plurality of predetermined individual conditions is satisfied. By way of example, various individual conditions as will be described below are stored beforehand as individual conditions, and when any of the stored conditions is satisfied, the image forming conditions at that time may be registered.

As regards items of image forming conditions necessary for setting the image forming apparatus to a certain state, individual conditions are stored for each image forming condition that requires complicated user operations for setting the items. When any of the conditions is satisfied, the image forming conditions at that time are registered. Once the image forming conditions are registered, by calling the image forming conditions, the image forming conditions of the image forming apparatus are set to the state when the corresponding job program was registered. As a result, the image forming conditions realized by various types of operations can be called in a simple manner without requiring troublesome operations.

The input device may include a display device, and a setting device connected to the display device, presenting image forming conditions by the image forming unit in the form of a multi-layered menu, allowing setting by the user. The registering device may include a device connected to the image forming unit, the first storage and the second storage, responsive to completion of image formation by the image forming unit, for registering, if an operation of setting an item on a layer deeper than a prescribed layer in the multi-layered menu is recorded in the history stored in the second storage, the image forming conditions stored in the first storage.

Assume, for example, that image forming conditions are set using items provided in the form of a hierarchical menu having first to fifth to seventh layers. If an item at a layer of the third or deeper layer is set, it is necessary for the user to go down the menu tree to the desired layer. Therefore, the involved operations are complicated. In such a situation, the image forming conditions set by such operations are registered to allow calling at any time. The image forming conditions can be called by a simple operation. When the image forming conditions are called, the state of image forming apparatus can be returned to the state when the image forming conditions were registered. Therefore, items related to image forming conditions on a hierarchical menu having many layers can be set easily, without necessitating troublesome operations by the user.

The image forming apparatus may further include a comparing device comparing the number of actual operation steps by the user recorded in the user history stored in the second storage with the number of operation steps typically required for setting the image forming conditions stored in the first storage. The predetermined condition may be that the number of actual operation steps by the user is larger than the number of typically required operation steps.

If the user is confused or has trouble in setting the image forming conditions, the number of steps of the user operations for setting items related to image forming conditions becomes larger than the number of steps usually required. Namely, the operations here are complicated or difficult for the user. In such a case, the procedure of setting the image forming conditions is determined to satisfy the condition that the procedure is "complicated," and the image forming conditions are registered in the image forming apparatus. By calling the registered image forming conditions later, the image forming apparatus can be set to the image forming conditions. Therefore, even those image forming conditions that are not familiar to the user can be set easily.

The image forming apparatus may further include a user identifying device that identifies a user. The predetermined condition may be set user by user of the image forming apparatus. The predetermined condition may be set or changed by the user of the image forming apparatus.

By way of example, when the image forming apparatus is shared by a plurality of users, it is common that different users are unfamiliar with different operations for setting image forming conditions. In the present image forming apparatus, it is possible to set conditions for registering the image forming conditions in the image forming apparatus user by user. Therefore, it is possible to register image forming conditions considered necessary by each user. The condition for registering the image forming conditions in the image forming apparatus can be set or changed by the user himself/herself. The condition that should be satisfied by the user operations for registering the image forming conditions in the image forming apparatus can be customized by the user as he/she needs. Thus, image forming conditions useful for the user can be registered automatically.

The registering device may include: a determining device connected to the image forming unit, the first storage unit and the second storage unit, responsive to completion of image formation by the image forming unit, for determining whether or not the history stored in the second storage satisfies a predetermined condition; an instruction input unit provided to receive an output of the determining unit, responsive to positive determination by the determining device, for receiving a user instruction as to whether the image forming conditions stored in the first storage is to be registered or not; and a device, responsive to an instruction to register from the instruction input device, for registering the image forming conditions stored in the first storage device as image forming conditions that can be called by a unique identifier.

By such an approach, the set image forming conditions are registered in response to the user's request. Therefore, image forming conditions that satisfy the user's request can be registered.

According to a second aspect, the present invention provides a method of operating an image forming apparatus, including the steps of: receiving input of image data; receiving and storing in a first storage user input related to setting of image forming conditions when an image is formed on a medium based on the image data; storing a history of input operations by the user related to setting of the image forming conditions in a second storage; forming, in responses to reception of a user instruction to form an image, an image based on the image data on a medium; registering, in response to completion of the image formation, if the history stored in the second storage satisfies a predetermined condition, the image forming conditions stored in the first storage as image forming conditions that can be called by a unique identifier; and calling, in response to a user input designating the identifier, the image forming conditions corresponding to the identifier from the registration device and storing the image forming conditions in the first storage.

According to a third aspect, the present invention provides a setting apparatus used connected to a prescribed functional unit, for setting operation conditions when the prescribed functional unit operates, including: a first storage connectable to the functional unit, storing operation conditions when the functional unit operates; an input device receiving a user input setting the operation conditions, and storing the set operation conditions in the first storage; a second storage, connected to the input device, storing a history of input operations by the user using the input device; a registering device, connected to the functional unit, the first storage and the second storage, responsive to completion of an operation by the functional unit, for registering, if the history stored in the second storage satisfies a predetermined condition, the operation conditions stored in the first storage as operation conditions that can be called by a unique identifier; and a calling device, responsive to a user input designating the identifier, for calling the operation conditions corresponding to the identifier and storing the operation conditions in the first storage.

As described above, by the image forming apparatus and method as well as the setting device in accordance with the present invention, only the useful operation conditions can be registered without necessitating troublesome operations in registering the operation conditions such as the image forming conditions. Therefore, items on various and many menus of complicated configuration can be set easily, without necessitating troublesome operations by the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a management table storing job program registration conditions (hereinafter simply referred to as "registration conditions") stored in a hard disk of image forming apparatus 150 shown in FIG. 1.

DESCRIPTION OF THE PREFERRED EMBODIMENTS

Figure 1:
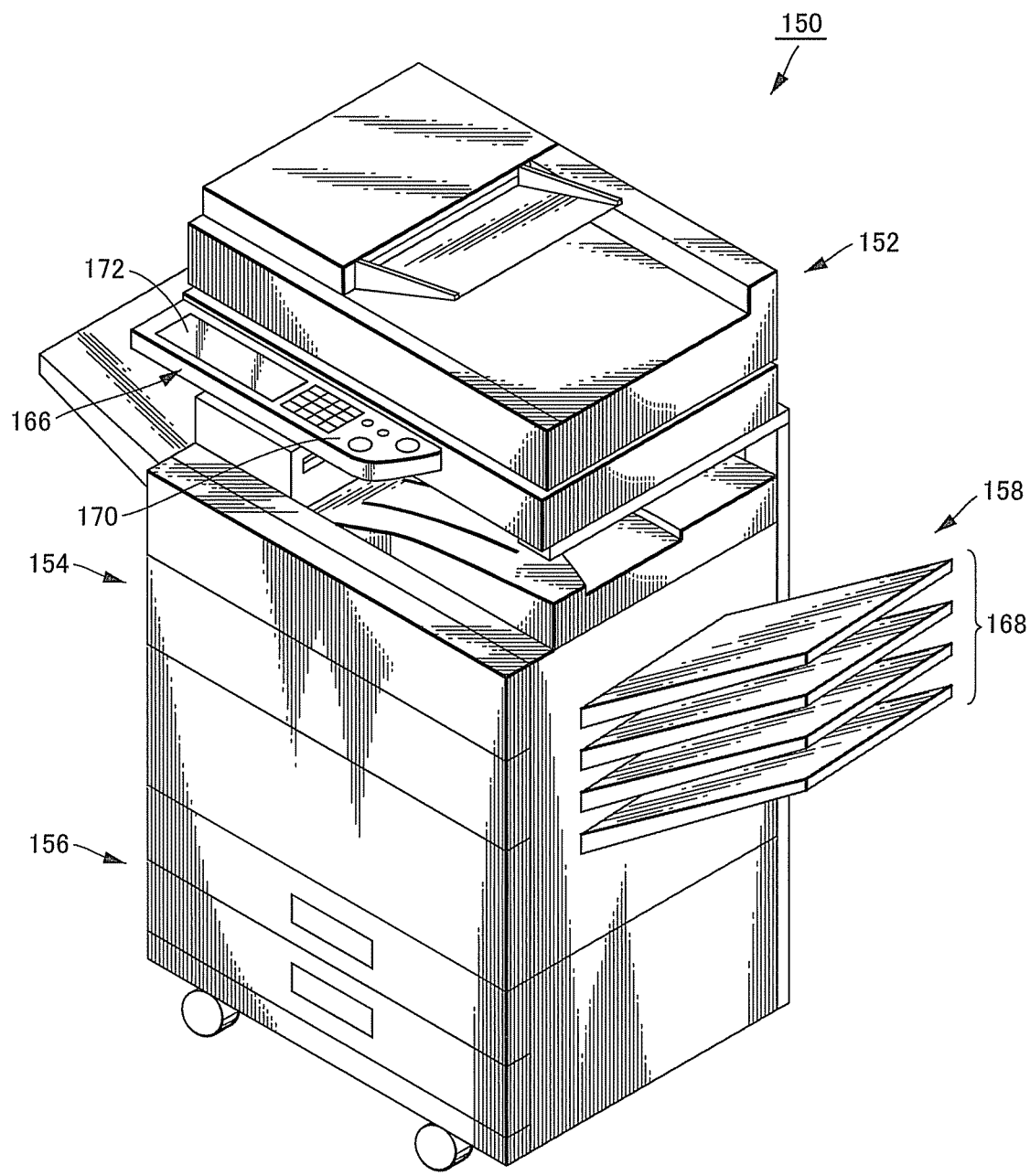
FIG. 1 is a perspective view showing an appearance of an image forming apparatus 150 in accordance with an embodiment of the present invention.

In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is not limited to MFP, and the image forming apparatus may be any device that has a plurality of functions and has a job program registration function of allowing calling of function setting with just a single touch. In the following description, "facsimile", "fax" and "FAX" are used not specifically distinguished from each other.

In the following, the image forming apparatus (MFP, multifunction peripheral) in accordance with an embodiment of the present invention will be described.

[Image Forming Apparatus (Hardware)]

Figure 2:
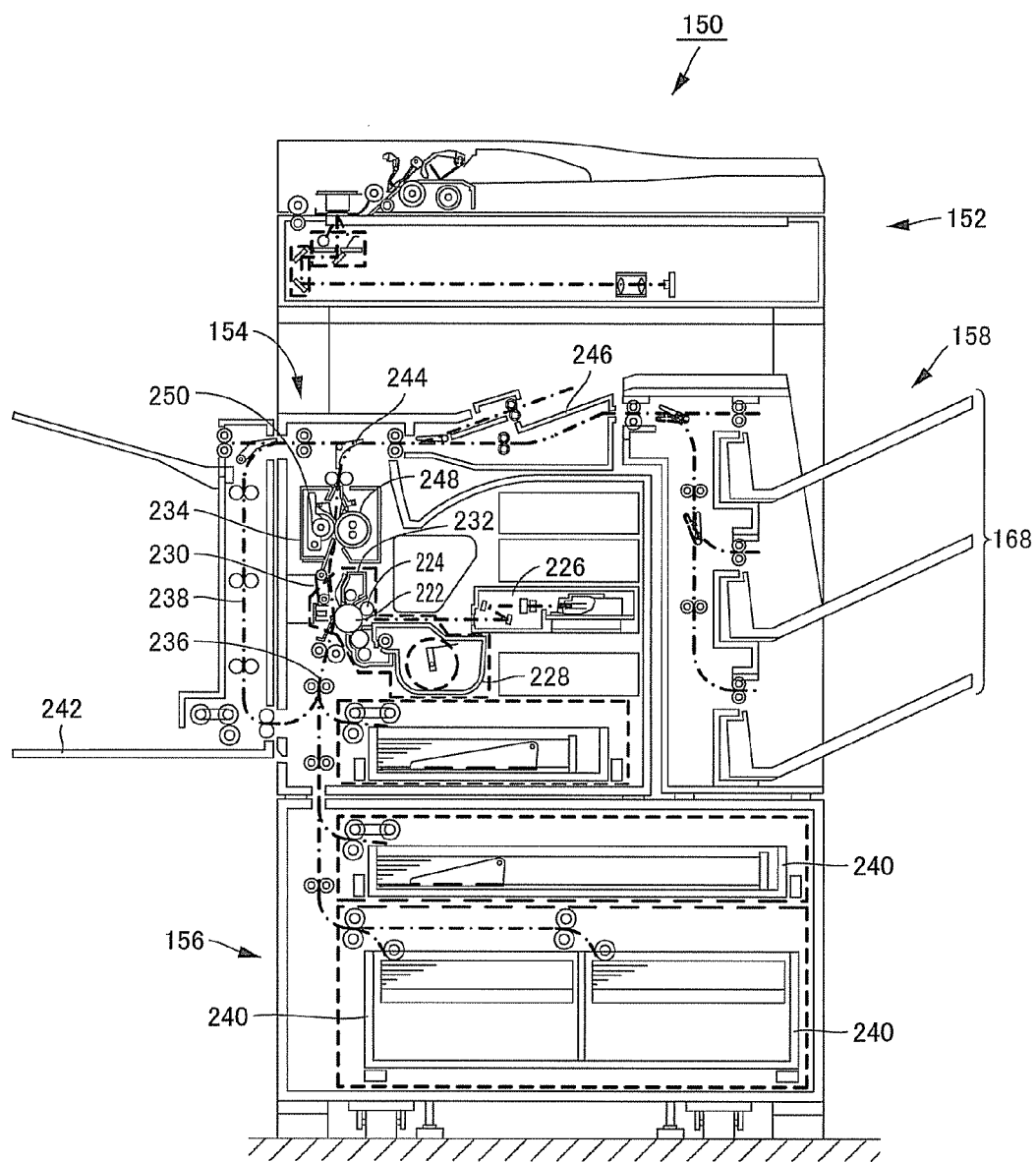
FIG. 2 schematically shows an internal configuration of image forming apparatus 150 shown in FIG. 1.
Figure 3:
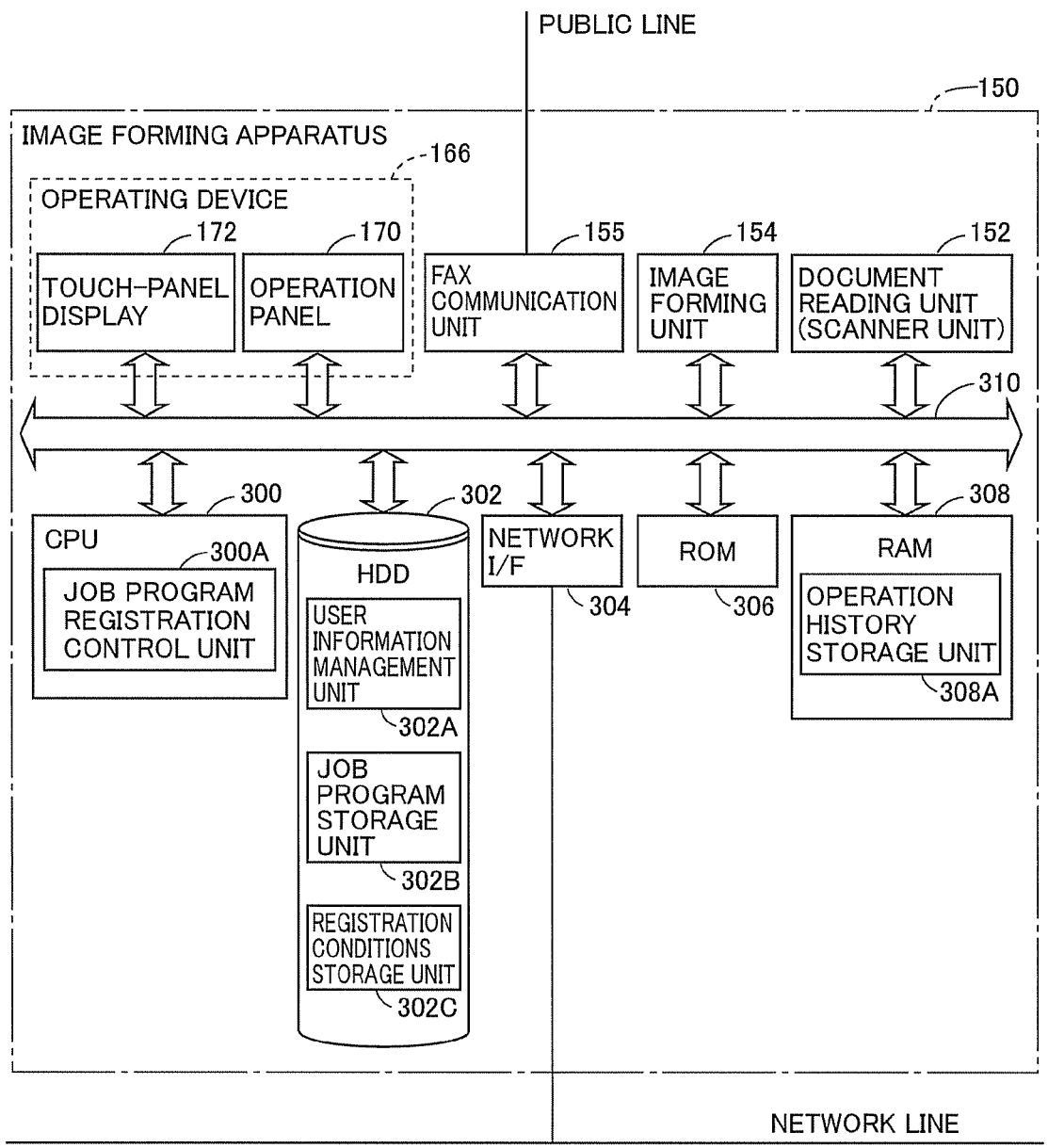
FIG. 3 is a functional block diagram showing a hardware configuration of image forming apparatus 150 shown in FIG. 1.

FIG. 1 shows an appearance of an image forming apparatus 150. FIG. 2 schematically shows an internal configuration of image forming apparatus 150. FIG. 3 is a functional block (control block) diagram showing hardware configuration of image forming apparatus 150.

Referring to FIGS. 1 and 2, an image forming apparatus 150 in accordance with an embodiment of the present invention includes a document reading unit 152, an image forming unit 154, a paper feed unit 156, and a discharge processing device 158. In the following, the operation in the copy mode as the basic function of image forming apparatus (MFP) 150 will be described, as description of internal configuration of image forming apparatus 150. It is assumed that image forming apparatus 150 has copying function (copy mode), facsimile function (fax/image transmission mode) and scanner function (document filing mode).

In the copy mode, mainly document reading unit (also referred to as a scanner unit) 152 and image forming unit 154 operate to realize the copy function.

In image forming apparatus 150, a document placed on a platen is read by document reading unit 152 as image data, and the read image data is input to CPU (Central Processing Unit) 300 implemented, for example, by a microcomputer shown in FIG. 3. In CPU 300, the image data is subjected to various image processing operations by the functions designated by a user logged-in to image forming apparatus 150. The resulting image data is output to image forming unit 154. After the end of a desired process, typically, the user logs out of the image forming apparatus.

Image forming unit 154 is for printing an image of the document represented by the image data on a recording medium (in most case, on a sheet of recording paper). Image forming unit 154 includes, by way of example, a photoreceptor drum 222, a charger 224, an LSU (laser scanning unit) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet is fixed on the sheet of recording paper. A heater is heated by electric power supplied to fixing device 234. By controlling power supply to the heater, the temperature of heating roller 248 is maintained at a temperature appropriate for fixing.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or to discharge processing device 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path, printing is done on its rear surface. Then, the sheet is guided to paper discharge tray 246 or to discharge processing device 158.

The sheet of recording paper on which printing is done in the above-described manner is guided to discharge tray 246 or to discharge processing device 158, and discharged to discharge tray 246 or to any of the discharge trays 168 of discharge processing device 158.

In discharge processing device 158, finishing process is executed when a finishing function is designated. The finishing process includes any of a process of sorting a plurality of printed sheets of paper to be output to different discharge trays 168, a process of punching each sheet of recording paper and a process of stapling the sheets of recording paper. Assume that a number of copies of the printing are to be prepared. In that case, sheets of recording paper are sorted and discharged to paper discharge trays 168 such that each tray 168 contains each set of printed sheets (sorting function is designated), and the set of printed sheets in each tray 168 is stapled (stapling function is designated) or punched (punching function is designated), whereby copies of prints are prepared.

When user operation for setting a function satisfies a predetermined registration condition, image forming apparatus 150 in accordance with the present embodiment executes a process for registering the set image forming conditions as a job program (job program registration process) automatically (or after user's confirmation). The registration condition is that the user operations are determined to be complicated. As a result, image forming conditions that the user would highly possibly consider convenient if registered as a job program are registered automatically or after user's confirmation, as a job program in image forming apparatus 150.

Such a job program is allocated to a specific key (for example, any of ten keys). By pressing the specific key subsequently, the image forming conditions of image forming apparatus 150 when the job program allocated to the key was registered can be called and image forming apparatus 150 can be set to the image forming conditions.

Such a characteristic is realized by the hardware configuration of image forming apparatus 150 as well as the hardware and software controlling image forming apparatus 150. In the following, first, the hardware configuration (control block) included in image forming apparatus 150 for executing the control will be described, followed by the description of the software configuration (program).

[Image Forming Apparatus (Control Block)]

Referring to FIG. 3, image forming apparatus 150 includes: an operating device 166 allowing settings related to the copy function, facsimile function and scanner function; an ROM (Read Only Memory) 306 for storing programs and the like; a hard disk 302 as a non-volatile storage area capable of storing programs and data even when the power is off; and an RAM (Random Access Memory) 308 for providing a storage area when a program is executed. When the power of image forming apparatus 150 is turned on, sometimes the data stored in hard disk 302 are transferred to RAM 308. A registration condition management table, which will be described later, is stored in hard disk 302 or in RAM 308.

Image forming apparatus 150 further includes a bus 310 connected to document reading unit 152, image forming unit 154, FAX communication unit 155, operating device 166, ROM 306, hard disk 302 and RAM 308, and a CPU 300 connected to bus 310, for realizing general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150.

As shown in FIG. 3, to FAX communication unit 155 of image forming apparatus 150, a public line is connected for transmitting/receiving image data, and to network IF 304, a network line is connected. To the network line, a computer or the like using image forming apparatus 150 as a network-supported printer, or a computer or the like capable of transmitting/receiving a mail through the Internet may be connected.

RAM 308 provides a function of a working memory for temporarily storing results of operations and processes by CPU 300, and a function of a frame memory for storing image data.

Document reading unit 152, image forming unit 154, a flat, plate-shaped operation panel 170 and touch-panel display 172 of operating device 166, ROM 306, hard disk 302 and RAM 308 are controlled by CPU 300 executing a prescribed program.

Operating device 166 includes: a plate-shaped operation panel 170 arranged on the right side on a surface of operating device 166, provided with hardware keys including ten keys and various other operation buttons (such as a start key and a job program calling key); and a touch-panel display 172 formed of a small, touch-panel liquid crystal display device, arranged on the central to the left side of operating device 166. Operation panel 170 and touch-panel display 172 are held in one housing, and operating device 166 is formed integrally to be one piece.

On touch-panel display 172 of operating device 166, a state of operation of image forming apparatus 150, a menu and a submenu (a menu of a lower layer than the menu) displaying a plurality of functions allowing the user to select a desired function and the like are displayed. Here, the menu has a tree form. Each node of the tree provides an item that can be selected by the user in each layer, and a route to a menu (sub-menu) of a lower layer that allows more detailed designation by the user. If the user wants to set detailed items using the menu, he/she must move to each of the nodes following the route between each node.

On a display area of liquid crystal display device of display panel 172, selection buttons are displayed. When a portion where the selection button is displayed is pressed, the pressed position is detected by the touch panel. By comparing the display position of the selection button and the position where the touch panel is pressed using a program, setting of a function or instruction of an operation of image forming apparatus 150 becomes possible. Specifically, operating device 166 receives inputs and instructions from the user through interactive processes. In the following, display panel 172 may also be referred to as a touch-panel display 172.

As will be described later, operating device 166 has a function of receiving a user input for setting image forming conditions by image forming unit 154 and storing the set image forming conditions in RAM 308. Operating device 166 is also used when the user logs-in to image forming unit 154 before using image forming apparatus 150, and when the user logs out of image forming apparatus 150. In the present embodiment, information related to the user who is permitted to use image forming apparatus 150 is stored in hard disk 302 when the user logs-in to image forming apparatus. Operating device 166 manages user's log-in such that only the authorized users stored in hard disk 302 can use image forming apparatus 150.

As described above, CPU 300 realizes general functions as an image forming apparatus by executing a program. Image forming apparatus 150 in accordance with the present embodiment further includes a job program registration control unit 300A realized by a program executed by CPU 300. The program for realizing job program registration control unit 300A will be described later. Job program registration control unit 300A executes a process for registering, automatically or after user's confirmation, image forming conditions that satisfy the registration condition as a job program with an identifier that can be called uniquely. The registration condition refers to a specific condition that indicates the process for setting the image forming conditions being complicated. When a job program is registered, it becomes possible to call the image forming conditions corresponding to the job program by a simple operation using the identifier, and to set the image forming conditions accordingly. Thus, the user operations for inputting the image forming conditions can advantageously be simplified.

Pieces of information used by job program registration control unit 300A in executing the process are stored in hard disk 302 and RAM 308.

Hard disk 302 includes: a user information management unit 302A storing user ID for uniquely identifying each user who uses image forming apparatus 150; a job program storage unit 302B storing image forming conditions that satisfied the registration condition as a job program; and a registration condition storage unit 302C storing the job program registration condition. The job program stored in job program storage unit 302B is stored with the identifier that enables unique identification of the job program.

User information management unit 302A stores a combination of the user ID of a user who is permitted to use image forming apparatus 150, and a password or the like corresponding to the ID. When the user logs-in to image forming apparatus 150, CPU 300 can identify the user of image forming apparatus 150. Since the user can be identified, it is possible to set registration condition for each user. If the operation history of the user when he/she logs-in to image forming apparatus 150 satisfies the registration condition, the job program specified for the user can be stored.

Job program storage unit 302B stores, for each user, a job program (set contents), together with the number for calling the job program and the program name. The number is an identifier for uniquely identifying the job program and corresponds to the value allocated to each of the ten keys, that is, a number from 0 to 9. When a hardware key referred to as a job program calling key is pressed and thereafter a desired ten key is pressed, the job program having the number (identifier) corresponding to the ten key value is called. The called job program returns the image forming conditions of image forming unit 154 to the conditions when the job program was registered. Specifically, when the job program is called, the image forming conditions at the time when the job program was registered are stored as the image forming conditions of image forming unit 154 in RAM 308. Since the job program is stored user by user, actually, the job program is stored with a combination of user identifier and job program identifier used as one identifier, in job program storage unit 302B. At the time of calling, the job program is identified by the set of user identifier and job program identifier and called.

Registration condition storage unit 302C stores registration conditions set corresponding to the menu layers for setting functions in image forming apparatus 150. The menu layers and the registration conditions will be described later.

RAM 308 includes an operation history storage unit 308A storing operation history of the user for setting using a touch-panel display 172 of image forming apparatus 150. The operation history includes an operation sequence on touch-panel display 172 step by step, from when the user starts an operation for changing default value setting of any function until image formation starts (until the user presses the START key). In the present embodiment, operation history storage unit 308A is provided in RAM 308. Therefore, when the power to image forming apparatus 150 is turned off, the operation history stored in operation history storage unit 308A is discarded. If it is necessary to save the operation history for a long time, the operation history may be stored in a non-volatile external storage such as hard disk 302. The operation history is written to RAM 308 at the time of power on, and as the user operation proceeds the operation history in RAM 308 is updated. The contents stored in RAM 308 and hard disk 302 are synchronized as needed.

As described above, registration condition storage unit 302C of image forming apparatus 150 in accordance with the present embodiment stores the registration condition. In connection with the registration condition, the menu hierarchy (layers) for setting the functions (items of image forming conditions) in image forming apparatus 150 will be described.

Figure 4:
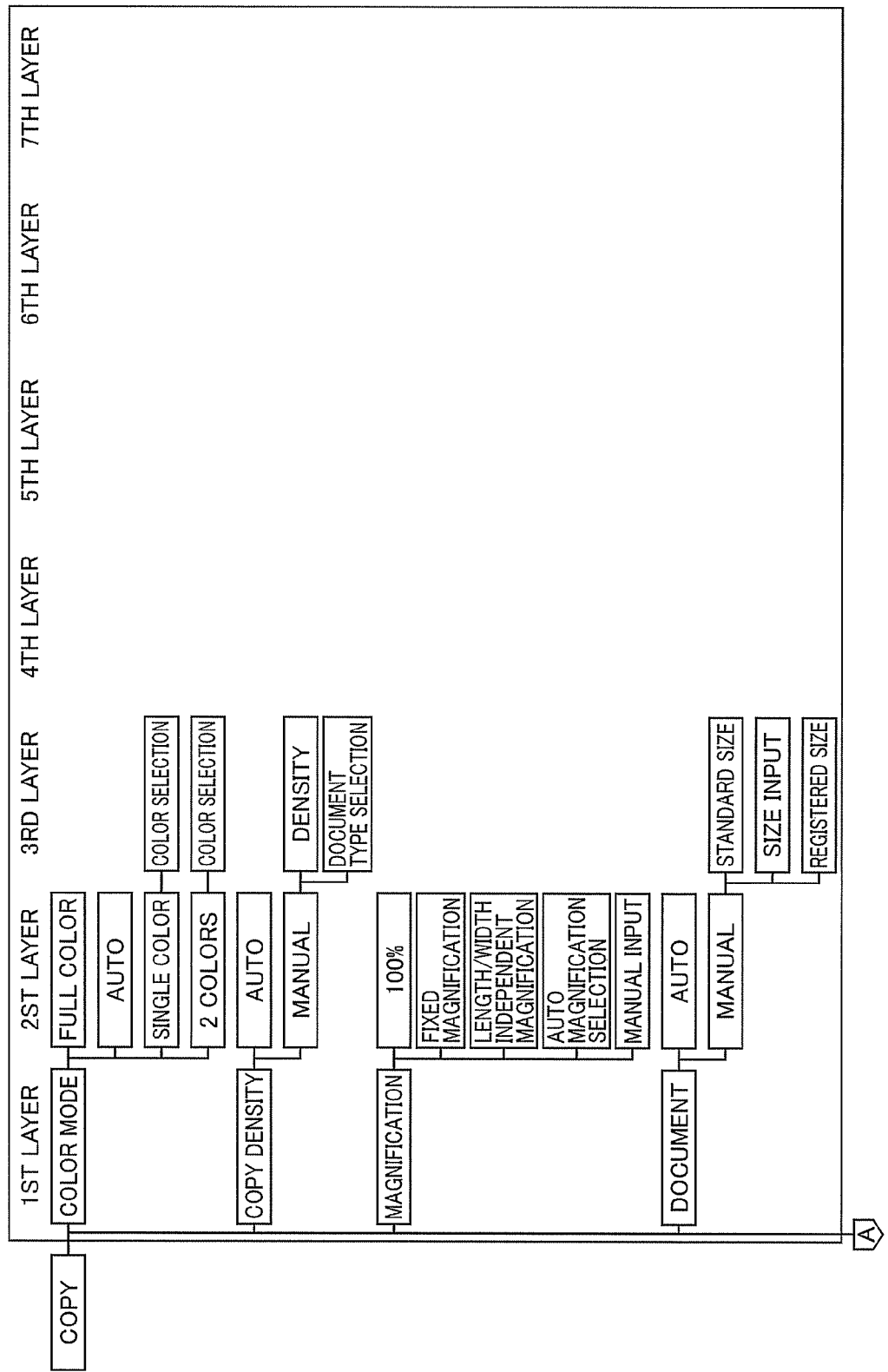
FIGS. 4 to 6 show menu layers in the image forming apparatus 150 of FIG. 1.
Figure 5:
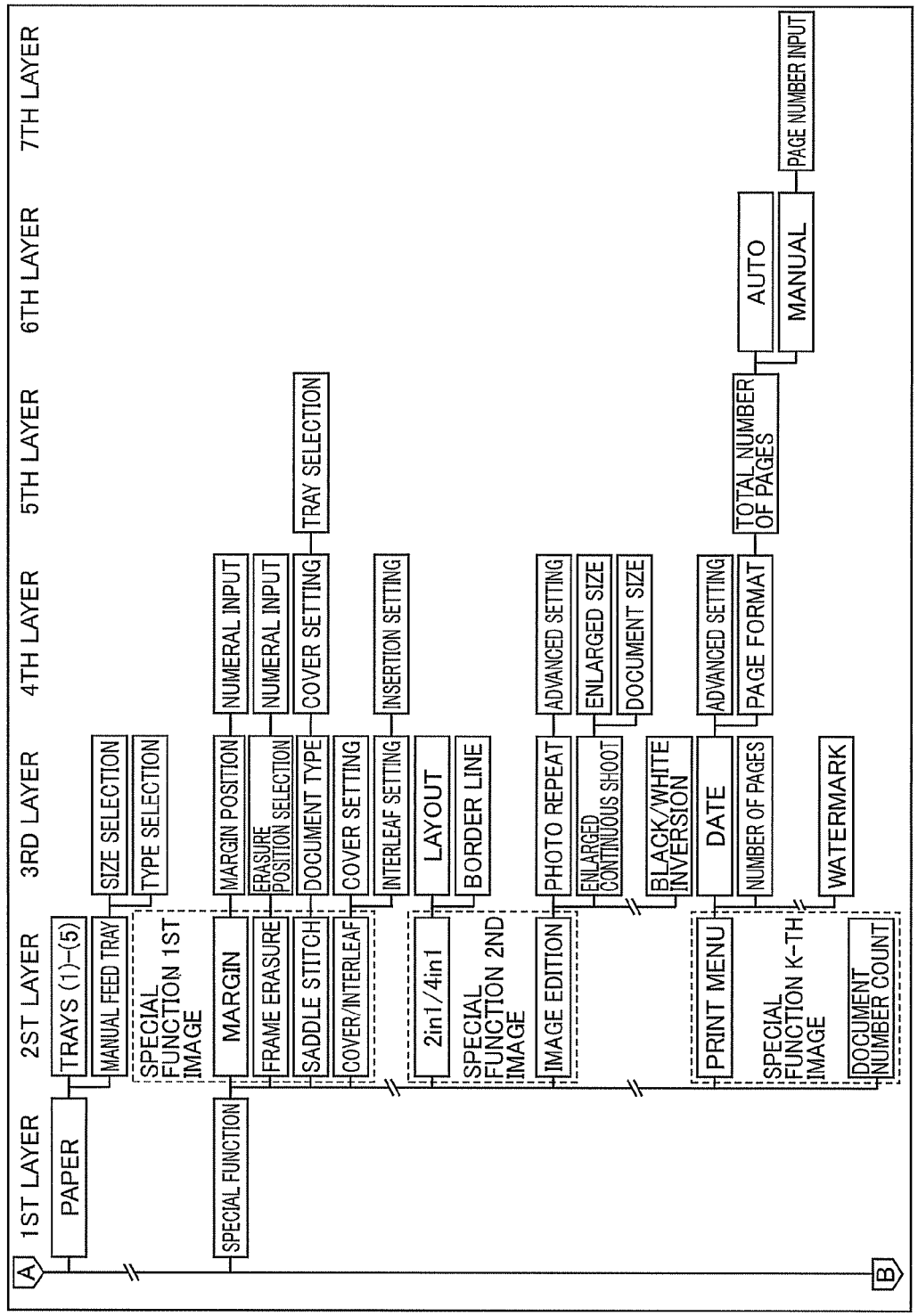
Figure 6:
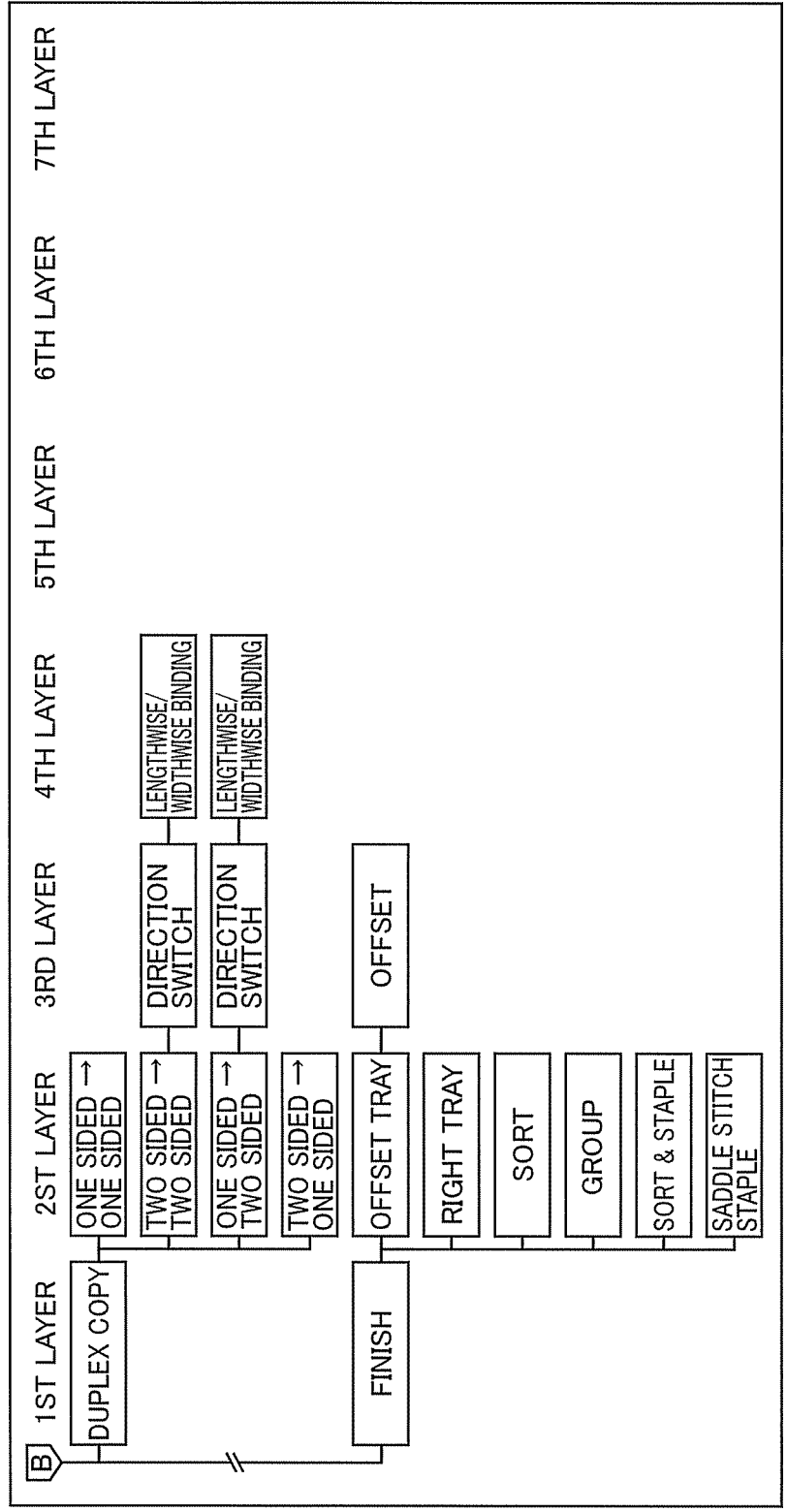

FIGS. 4 to 6 show the menu hierarchy (layers) related to functions settable in the copy mode of image forming apparatus 150. In addition to the layers shown in these figures, image forming apparatus 150 is provided with menu hierarchies related to other modes (fax/image transmission mode and document filing mode). The menu hierarchies of these modes also have the menu configuration including the first to about seventh layers similar to those shown in FIGS. 4 to 6. It is noted that the mode selection itself is also done using the menu. The menu is on the upper layer than the menu for inputting set values in each mode. Therefore, in the following description, the menu for selecting a mode is described as the 0-th layer menu.

As shown in FIGS. 4 to 6, the copy mode of image forming apparatus 150 has a menu configuration including the first to seventh layers. The first layer includes eight menu items, i.e, "color mode," "copy density," "magnification," "document", "paper", "special function," "duplex copy" and "finish," that correspond to selection buttons on the initial image in the copy mode displayed on touch-panel display 172.

Each of the menu items of the first layer has a sub-menu of the second and deeper layers. By way of example, the menu item "color mode" of the first layer has a sub-menu including four menu items, i.e., "full color," "auto," "single color" and "two colors." The menu items "single color" and "two colors" on the second layer each have one menu item of "color selection" as the third layer.

When selection of a function is completed on the deepest layer of the menu (when the OK button, for example, is pressed on the setting image), the display returns to the initial image (the image displaying the eight items of the first layer). It is not the case, however, for the images of functions referred to as "special function" shown in FIG. 5 that requires a plurality of images to be used for inputting set values.

Referring to FIG. 5, the number of menu items for "special function" is large. Therefore, images for setting the items are displayed separately on a plurality of pages on touch-panel display 172. For instance, below the item "special function" (first layer), four menu items of the second layer, i.e, "margin," "frame erasure," "saddle stitch," and "cover/interleaf" are displayed on the first image (first page) of the special function; two items of the second layer, i.e, "2-in-1/4-in-1" and "image edition" are displayed on a second image (second page); and two items of the second layer, i.e, "print menu" and "document number count" are displayed on the third image (third page) of the special function, respectively. The images here are mere examples, and the arrangement of menu items are not limited to the above. The number of images for setting the special function may be three or more.

Image transition for setting the "special function" involving a plurality of menu images of the second layer is as follows. Assume that from the first image of the "special function" menu of the first layer, the item "margin" is set and thereafter, items "margin position" and "numeral input" are set and the OK button is pressed. Then, the image returns to the first image of "special function." When "frame erasure" of the same "special function" is to be set, this item can directly be selected from the first image of "special function." In contrast, after setting the "margin," if "2-in-1/4-in-1" of the "special function" is to be set, switching from the first image of "special function" to the second image of "special function" is necessary. In other words, though the items belong to the same "special function" of the first layer, it is necessary to switch (move or make transition) to other image of "special function," depending on the item of the second layer.

The menu hierarchy shown in FIGS. 4 to 6 is only an example, and it may be changed appropriately by the manufacturer of the image forming apparatuses, or may be changed type by type of the image forming apparatuses even if the apparatuses are manufactured by the same manufacturer. Therefore, it should be understood that the menu hierarchy shown in FIGS. 4 to 6 is not limiting.

Referring to FIG. 7, the registration conditions stored in registration condition storage unit 302C will be described. As shown in FIG. 7, the registration condition is stored in a registration condition storage unit 302C in the form of a management table including a field for storing a condition number and a field for storing the registration condition corresponding to the registration number.

As the registration conditions, seven conditions are shown in FIG. 7. Conditions Nos. (1) to (5) are basic, individual registration conditions related to the hierarchical menu shown in FIGS. 4 to 6. Conditions (A) and (B) are collateral conditions for determining which image forming conditions corresponding to which user operation history among the user operation histories satisfying the basic conditions are to be registered as the job program. If a user operation history satisfies any of the basic individual registration conditions (Conditions (1) to (5)) and every such user operation history is registered automatically, it is highly likely that a large number of similar job programs are registered. Therefore, only the operation history that satisfies the basic condition and further satisfies either the collateral condition (A) or (B) is registered as a job program.

In the present embodiment, when any of the conditions (1) to (5) shown in FIG. 7 is satisfied, the process for registering as a job program is executed. In the present embodiment, the basic registration conditions and collateral conditions are set and stored user by user. Further, the conditions may be set or changed (maintained) by each user.

In the following, examples that satisfy or not satisfy each of the basic registration conditions (1) to (5) will be described.

Condition (1) is satisfied if an item at a deep layer of N-th or deeper layer of the hierarchical menu shown in FIGS. 4 to 6 is set (changed from the default value). Assume, for example, that N=3. Then, if "full color" (second layer) below "color mode" (first layer) is set, the operation sequence is not registered as a job program. However if "color selection" (third layer) below "single color" (second layer) belonging to "color mode" (first layer" is selected, the condition for registering the image forming conditions corresponding to the operation history at this time as a job program is satisfied.

Condition (2) is satisfied if the number of items changed from the default values in the hierarchical menu of FIGS. 4 to 6 is a prescribed number or larger. For easier understanding, assume that the prescribed number is 3. If the user starts from "copy density" item to "manual" and sets "density" and thereafter from "magnification" to "manual input", the image forming conditions corresponding to the operation sequence are not registered as a job program. If the user additionally goes to "paper" and sets "tray (2)", the basic condition for registering the image forming conditions as a job program is satisfied.

Condition (3) is satisfied when the user inputs two or more values of items belonging to the (M+1)-th layer, below mutually different menu items of the M-th layer, for example, in the hierarchical menu shown in FIGS. 4 to 6. Assume that M=1. If the user sets "margin" (second layer) and "frame erasure" (second layer) below "special function" of the first layer, condition (3) is not satisfied. The image forming conditions at this time are not registered as a job program. The reason for this is that though values of two or more items are input, these come from the same menu item of the upper layer, that is, the M-th layer (M=1). If the value of item "auto" (second layer) below "copy density" of the first layer is set by the user and the value of "document number count" (second layer) below "special function" of the first layer (different from "copy density") is set by the user, the basic condition for registering the image forming conditions at this time as a job program is satisfied. The reason for this is that two or more items are set and the items have different menu items as the parents on the M-th layer (M=1).

Condition (4) is satisfied if the number of operation steps by the user for setting using the hierarchical menu shown in FIGS. 4 to 6 is larger than the number of steps usually required for the setting. This corresponds to a situation that the user was confused in operation, so that he/she once made operations to select hierarchical menu not including the desired item and thereafter became aware of his/her error and again made operations, this time correctly, to select the hierarchical menu. By way of example, assume that the user confuses "document" and "paper." What the user should do is an operation to select an A4 sized document (the number of operation steps in this case is three, including "document," "manual" and "registered size"). Assume that the user, because of confusion, first made an operation to select an A4 sized paper and then made an operation to select the A4 sized document (in this case, the number of operation steps is 6, additionally including three steps of "paper," "manual feed tray" and "size selection"). In order to avoid registration of simple error as a job program, it may be possible to register the image forming conditions as a job program when the following relation is satisfied, where a=the number of operation steps for setting executed by the user, b=the number of operation steps typically required for setting, and X=1 or 2.

The present embodiment corresponds to a situation where X=0.

$$a > b + X.$$

Here, as the method of calculating the "number of operation steps typically required for setting," various methods may be available. The simplest method is use of the number of edges in a partial tree that consists only of the items set by the user on the menu. When the operation moves from one node to another, the flow must follow an edge of the tree. In a case where printing starts only when the print start key of the highest layer is pressed, the typically required number is twice the number of edges of the partial tree. The value may differ dependent on how the menu is implemented. The method of calculation may be determined for each apparatus.

Condition (5) is satisfied if items involving transition of images on touch-panel display 172 are selected in the hierarchical menu shown in FIGS. 4 to 6. By way of example, "special function" includes a large number of menu items on the second layer as shown in FIG. 5 and, therefore, the menu items of the second layer are covered by the first to K-th images. Therefore, if items that require switching of images for setting are selected, condition (5) is satisfied, even when the items belong to the same "special function" of the first layer. Assume that from the first image of the "special function" menu of the first layer, the item "margin" is set and thereafter, items "margin position" and "numeral input" are set and the OK button is pressed. Then, the image returns to the first image of "special function." Thereafter, when "2-in-1/4-in-1" of the same "special function" is set, the basic condition for registering the job program is satisfied (since this process requires transition from the first image of "special function" to the second image of "special function"). On the other hand, if "frame erasure" below "special function" is set after setting "margin," the process for registering as a job program is not executed (since it can directly be selected from the first image of "special function" and transition of images is unnecessary).

In the following, contents of collateral conditions (A) and (B) will be described.

Condition (A) defines that if setting is changed while the document as an object of copying is not changed and a copy job is executed, only the last setting is to be the object of job program registration. Typical example is: the user who pressed the start key and activated the copy process of image forming apparatus found erroneous setting from the resulting image formed on a sheet of recording paper, and copied the same document again with a different setting. The last setting means the setting immediately before the document is removed.

Condition (B) defines that when the same user copies a plurality of documents, the setting selected by the user is to be the object of job program registration. Typically, only one task (job) is done by the user after log-in until log-out from the image forming apparatus 150. Specifically, it is expected that generally one job is executed during log-in. It is possible, however, that the user executes a plurality of jobs during log-in, and the jobs may satisfy the basic registration conditions described above. In that case, it is desirable to let the user select which of the image forming conditions satisfying the registration conditions is to be registered as the job program. Condition (B) is for such a process. Therefore, whether or not condition (B) is satisfied is not automatically determined. User instruction determines which of the image forming conditions is to be registered as the job program. Naturally, there is an option of not registering any of the conditions as the job program.

Image forming apparatus 150 in accordance with the present embodiment includes job program registration control unit 300A executing the process of registering the image forming conditions set by the user operation satisfying the registration condition as the job program automatically or after user confirmation. Though job program registration control unit 300A may be implemented by hardware, in the present embodiment, it is realized by software having the control structure as described below.

[Software Configuration]

Figure 8:
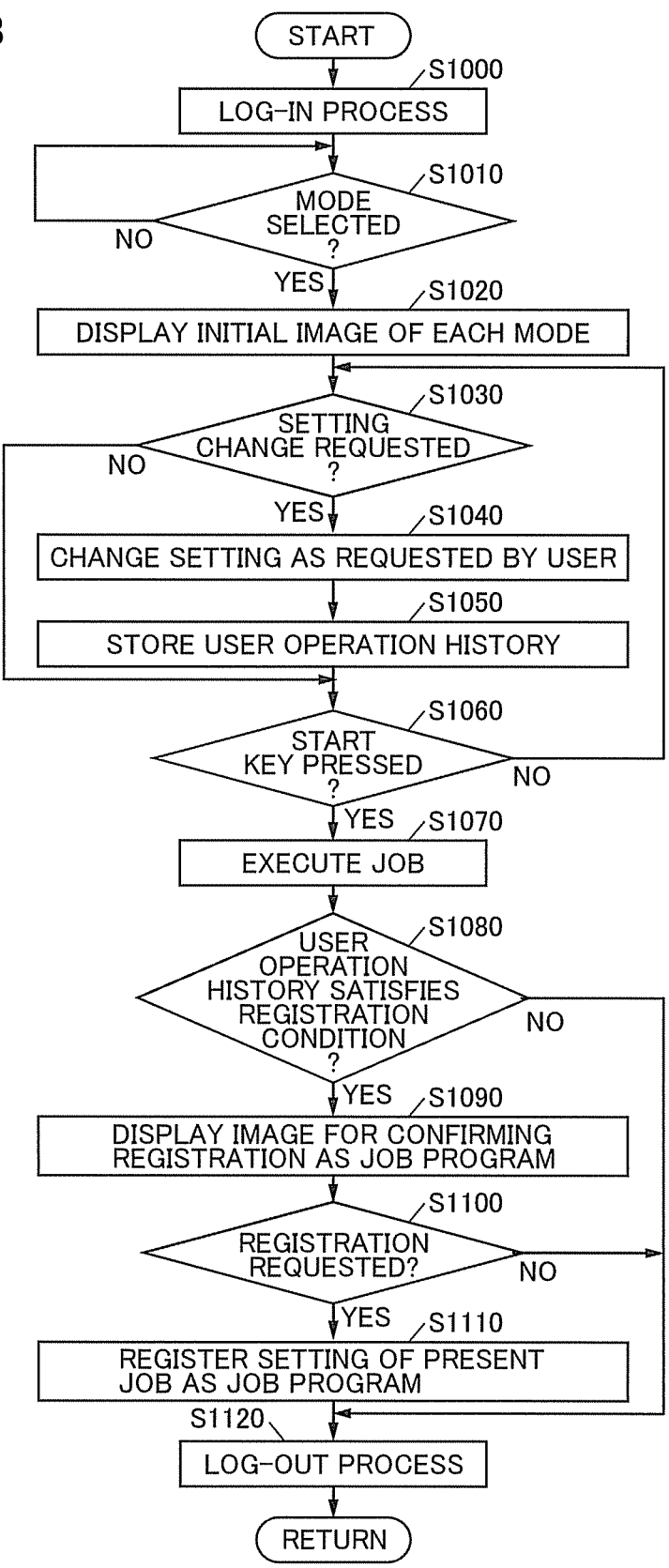
FIG. 8 is a flowchart representing a control structure of a program executed by the image forming apparatus in accordance with an embodiment of the present invention.

FIG. 8 is a flowchart representing a control structure of a program executed by CPU 300 of image forming apparatus 150. The flowchart represents the process in which operation history of a logged-in user executing a job is stored in operation history storage unit 308A and in which, if the operation history satisfies any of the registration conditions (1) to (5) stored in registration condition storage unit 302C, the contents set by the operation history is stored in job program storage unit 308B. In parallel with such a program, CPU 300 executes a program realizing general functions of a computer or an image forming apparatus. The program, however, is not directly related to the essential part of the present invention and, therefore, detailed description thereof will not be given here.

Referring to FIG. 8, at step (hereinafter "step" will be denoted as "S") 1000, CPU 300 of image forming apparatus 150 (hereinafter simply referred to as CPU 300) executes the log-in process. Here, CPU 300 determines whether or not the user who is to use image forming apparatus 150 has made a log-in request and logged-in. CPU 300 displays an image allowing input of user ID and password on touch-panel display 172, and if the user ID and the password are input, it determines that the user who is to use image forming apparatus 150 has logged-in. If the input user ID and the password match the user ID and the password stored in user information management unit 302A, CPU 300 permits log-in. When log-in is permitted by CPU 300, the input user ID is stored as the currently logged-in user, in hard disk 302 (or RAM 308). If user management is not carried out, the log-in process of S1000 and the log-out process of S1120, which will be described later, are not executed. It is also possible to execute the log-in process using an authentication server.

At S1010, CPU 300 determines whether or not the user (logged-in user) using image forming apparatus 150 has selected any mode. Image forming apparatus 150 has three modes, that is, the copy mode, fax/image transmission mode and document filing mode as described above (it may additionally has printer mode). By way of example, if any of software buttons (tug buttons) corresponding to the three modes displayed at the uppermost portion of touch-panel display 172 is pressed, CPU 300 determines that the user has selected a mode. If the mode is selected by the user (YES at S1010), the process proceeds to S1020. Otherwise (NO at S1010), the process returns to S1010 and waits until a mode is selected.

At S1020, CPU 300 displays an initial image of each mode on touch-panel display 172. Here, if a job program or programs are registered for each logged-in user in image forming apparatus 150, CPU 300 displays a list of job programs corresponding to the logged-in user on touch-panel display 172. If the job programs are not registered for each logged-in user, a list of job programs common to the users is displayed on touch-panel display 172. In the following, description will be given assuming that job programs are registered for each logged-in user. Here, registration conditions may also be set for each user.

At S1030, CPU 300 determines whether or not the user requested change of setting. Here, CPU 300 makes a determination based on the contents of user operation on touch-panel display 172. If any of the menu items of hierarchical menu shown in FIGS. 4 to 6 is selected and the default value is changed, it is determined that the change of setting is requested by the user. If it is determined that the user requested change of setting (YES at S1030), the flow proceeds to S1040. Otherwise (NO at S1030), the process proceeds to S1060.

At S1040, CPU 300 changes the setting as requested by the user. At S1050, CPU 300 stores the user operation history in operation history storage unit 308A. Here, CPU 300 stores the operation sequence on touch-panel display 172 step by step, from when the user starts an operation for changing default value setting of any function until image formation starts (until the user presses the START key), in operation history storage unit 308A.

At S1060, CPU 300 determines whether or not the user has pressed the start key. Here, CPU 300 makes a determination based on whether or not the start key as a hardware key provided on operation panel 170 is pressed by the user. If it is determined that the start key is pressed (YES at S1060), the process proceeds to S1070. Otherwise (NO at S1060), the process returns to S1030 and change of setting continues. Here, CPU 300 stores the user operation sequence from when, after log-in, the user starts an operation of changing the default value of each function in the selected mode until the start key is pressed, step by step as the operation history in operation history storage unit 308A.

At S1070, CPU 300 executes a job using the set function, in the mode selected by the user.

At S1080, CPU 300 determines whether or not the user operation history satisfies the registration conditions of FIG. 7 (any of basic registration conditions (1) to (5)). If the user operation history is determined to satisfy any of the registration conditions (1) to (5) of FIG. 7 (YES at S1080), the process proceeds to S1090. Otherwise (NO at S1080), the process proceeds to S1120.

At S1090, CPU 300 displays an image allowing confirmation of registering the present setting as a job program, on touch-panel display 172. At S1100, CPU 300 determines whether or not the user requested registration of the present setting as a job program. Here, if "YES" button is pressed by the user in response to a message "DO YOU WANT TO REGISTER AS JOB PROGRAM," CPU 300 determines that the user requested registration of the present setting as a job program. If it is determined that the user requested registration of the present setting as a job program (YES at S1100), the process proceeds to S1110. Otherwise (NO at S1100), the process proceeds to S1120.

At S1110, CPU 300 registers the setting of the job as a job program. At this time, CPU 300 stores the setting as a job program for each user, or a job program common to users, together with a call number (number of single-touch key) and a program name, in job program storage unit 302B.

At S1120, CPU 300 executes a log-out process. Here, CPU 300 determines whether or not the user who ended use of image forming apparatus 150 has made a log-out request. CPU 300 displays a log-out request button on touch-panel display 172 and if the button is pressed, it determines that the user who used image forming apparatus 150 has logged out. When log-out is requested, the information stored for the currently logged-in user is erased. In the present embodiment, the operation history stored in operation history storage unit 308A and the image forming conditions stored in RAM 308 are both cleared.

In the process of S1090 and S1100 shown in FIG. 8, if a copy job is once executed and thereafter, a copy job is again executed with the setting changed while the document as the object of copying is unchanged, only the last setting is regarded as the object of job program registration process in accordance with the collateral condition (A) shown in FIG. 7. If the user executes a plurality of copy jobs after log-in until log-out, which of the settings used for executing the plurality of copy jobs is to be registered is selected by the user in accordance with collateral condition (B) shown in FIG. 7.

Execution of process steps S1090 and S1100 is not always necessary. The present setting may automatically be registered as a job program. Specifically, the present setting may be registered as a job program without user confirmation as to the registration, unless one user executed a plurality of copy jobs (collateral condition (B)). In that case, it is desired that only the last setting is registered, in accordance with collateral condition (A).

[Operation]

The operation of image forming apparatus 150 in accordance with the present embodiment based on the structure and flowchart as above will be described with reference to FIGS. 9 to 12. In the following, description will be given assuming that the copy mode is selected by the logged-in user.

Based on the user request of copying a document using image forming apparatus 150, log-in process is executed (S1000).

Figure 9:
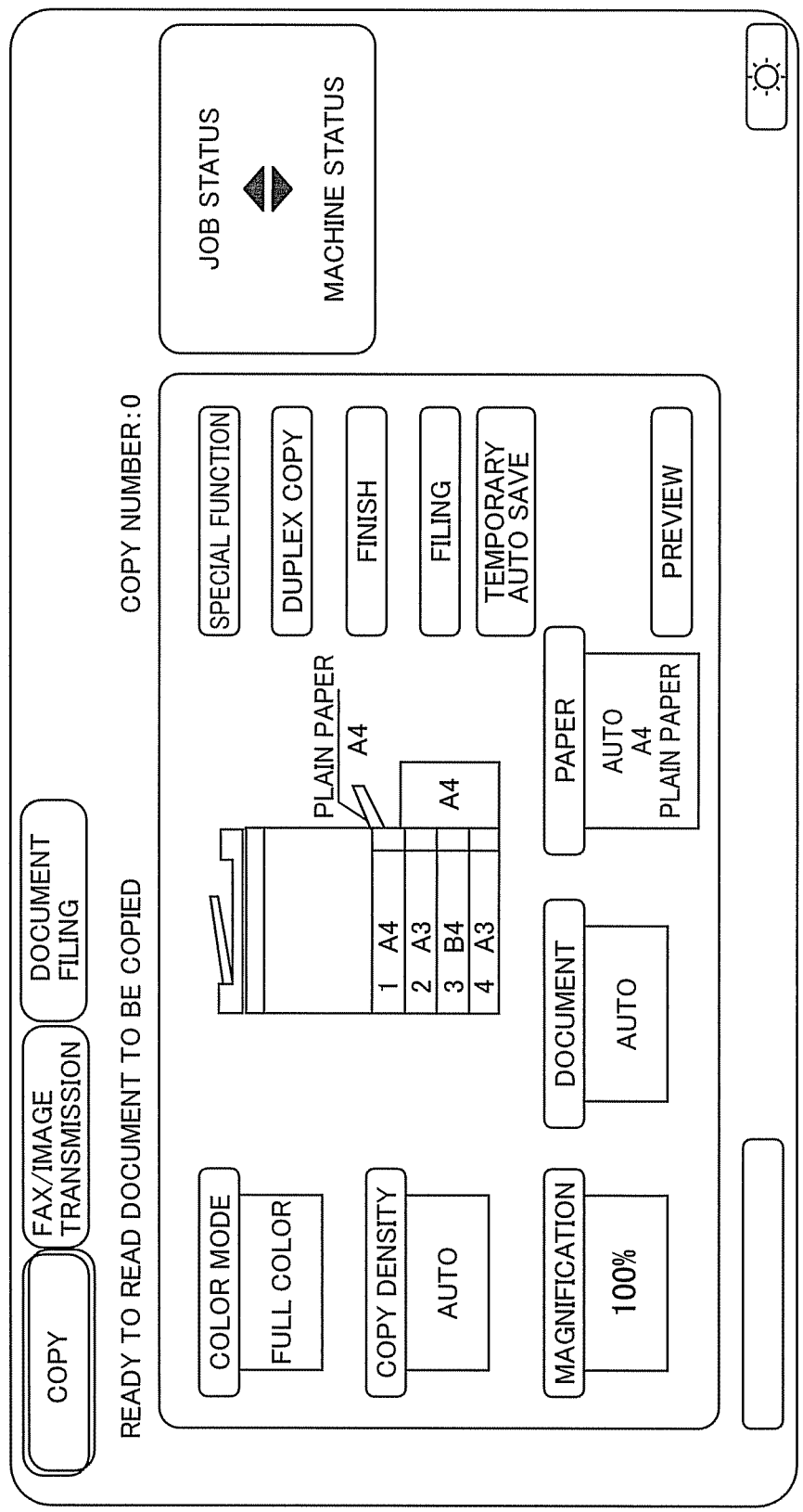
FIGS. 9 to 12 are exemplary images displayed on a touch-panel display 172 shown in FIG. 3.

The copy mode is selected (YES at S1010), and an initial image for copying such as shown in FIG. 9 is displayed on touch-panel display 172 (S1020). It is assumed that in the example of FIG. 9, no job program has been registered. In FIG. 9 and other drawings referred to in the following, a button in the selected state will be represented by a double frame. For example, in FIG. 9, the "COPY" button among the mode selection buttons is in the selected state as can be seen by the double frame.

Assume that, in the copy job, the logged-in user wishes to change the "copy density" (first layer) to be "manual" (second layer) and "density" (third layer) to the third level; to change the "magnification" (first layer) to "manual input" (second layer) and to 122%; and to change "paper" (first layer) to "manual feed tray" (second layer), A4 size ("size selection" (third layer)) and plain paper ("type selection" (third layer)).

Figure 10:
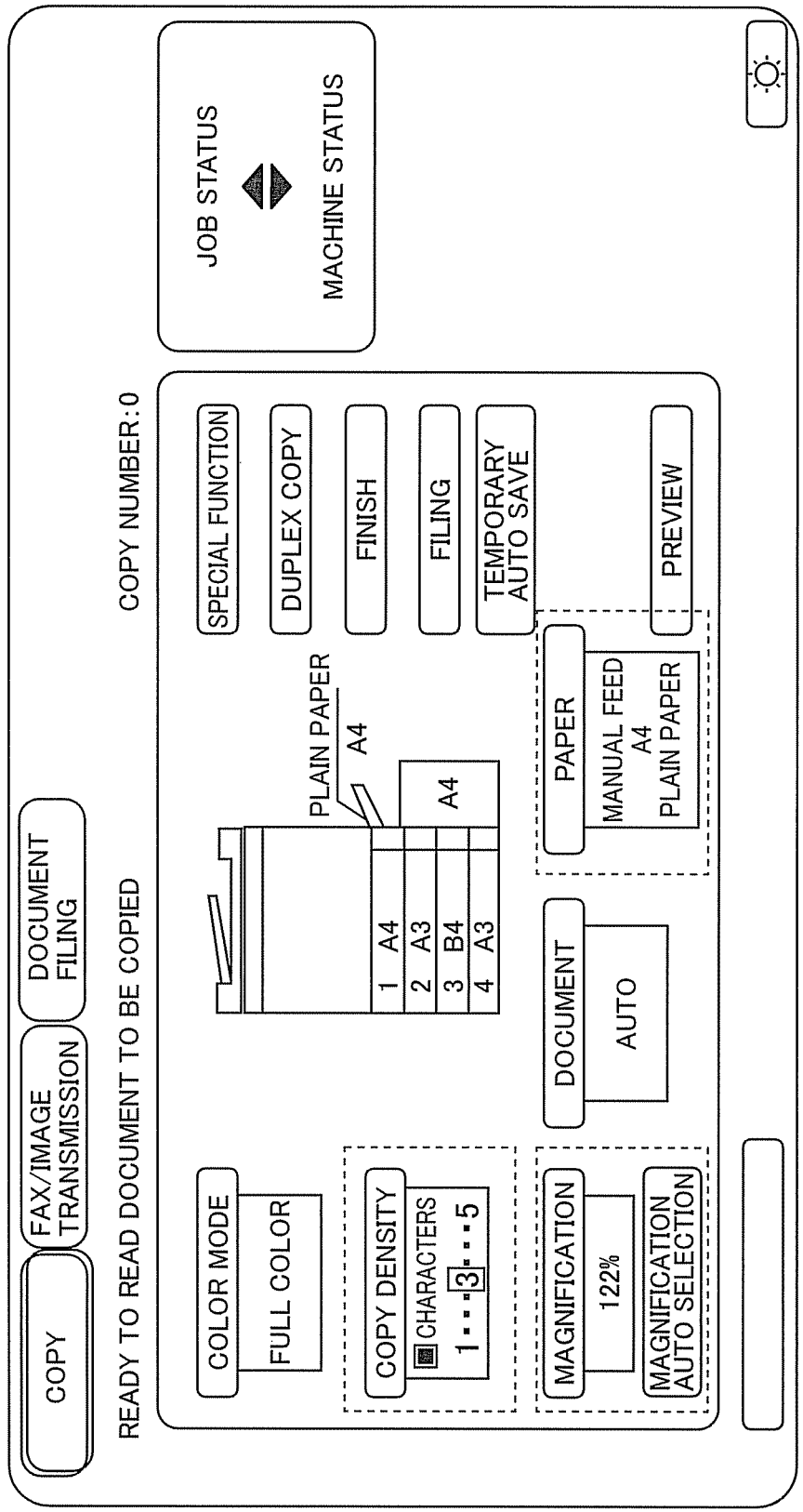

An exemplary image on touch-panel display 172 after the settings are changed in this manner by the user is shown in FIG. 10. Referring to FIG. 10, as shown by the dotted frame, "copy density" is change to level 3, "magnification" is changed to 122%, and "paper" is changed to A4 size plain paper of manual feed tray (YES at S1030, S1040).

When all changes of setting are completed, the logged-in user presses the start key, which is a hardware key on operation panel 170 (YES at S1060). The copy job is executed with the above-described setting (S1070).

The setting described above has default values of items on the third layer changed. Therefore, condition (1) of FIG. 7 is satisfied. Since the number of items changed from the default values is three, condition (2) of FIG. 7 is also satisfied. Further, since three items, that is, larger than two items, are set and the items come from different items of the first layer, condition (3) of FIG. 7 is also satisfied. Accordingly, the operation history of the user satisfies the registration conditions (YES at S1080), and an image for confirmation of registering as a job program is displayed on touch-panel display 172.

Figure 11:
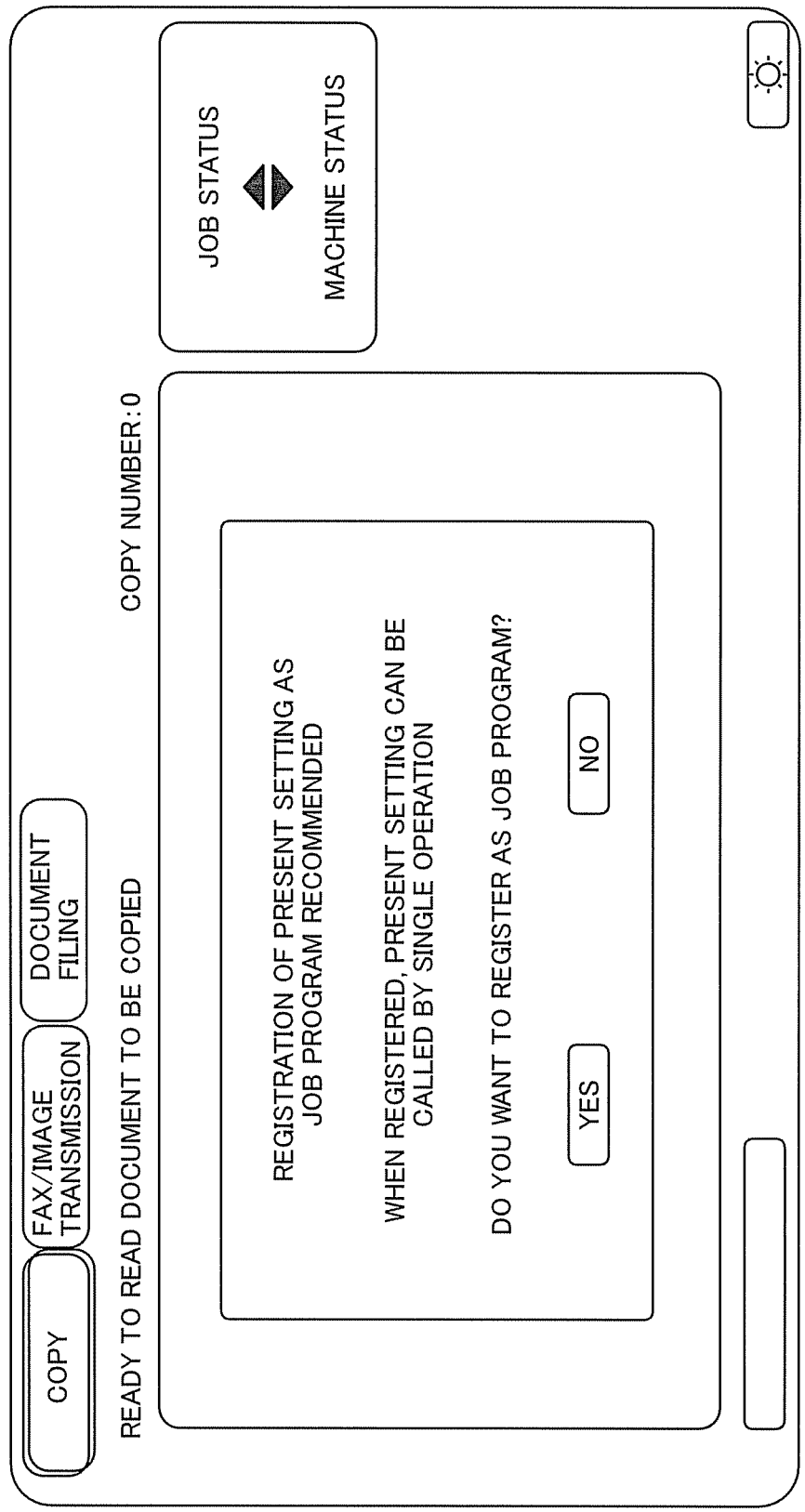

When the logged-in user presses "YES" button on the image of touch-panel display 172 shown in FIG. 11 (YES at S1100), the setting ("copy density" of level 3, "magnification" of 122% and "paper" of A4 size plain paper from manual feed tray) is registered as a job program (S1110). Here, the job program call number (the number of single-touch key) is set to "1" and the program name is set to "density 3, 122%, A4 plain paper." The program name is only an example, and it may be a different name (for example, user name+program serial number).

Figure 12:
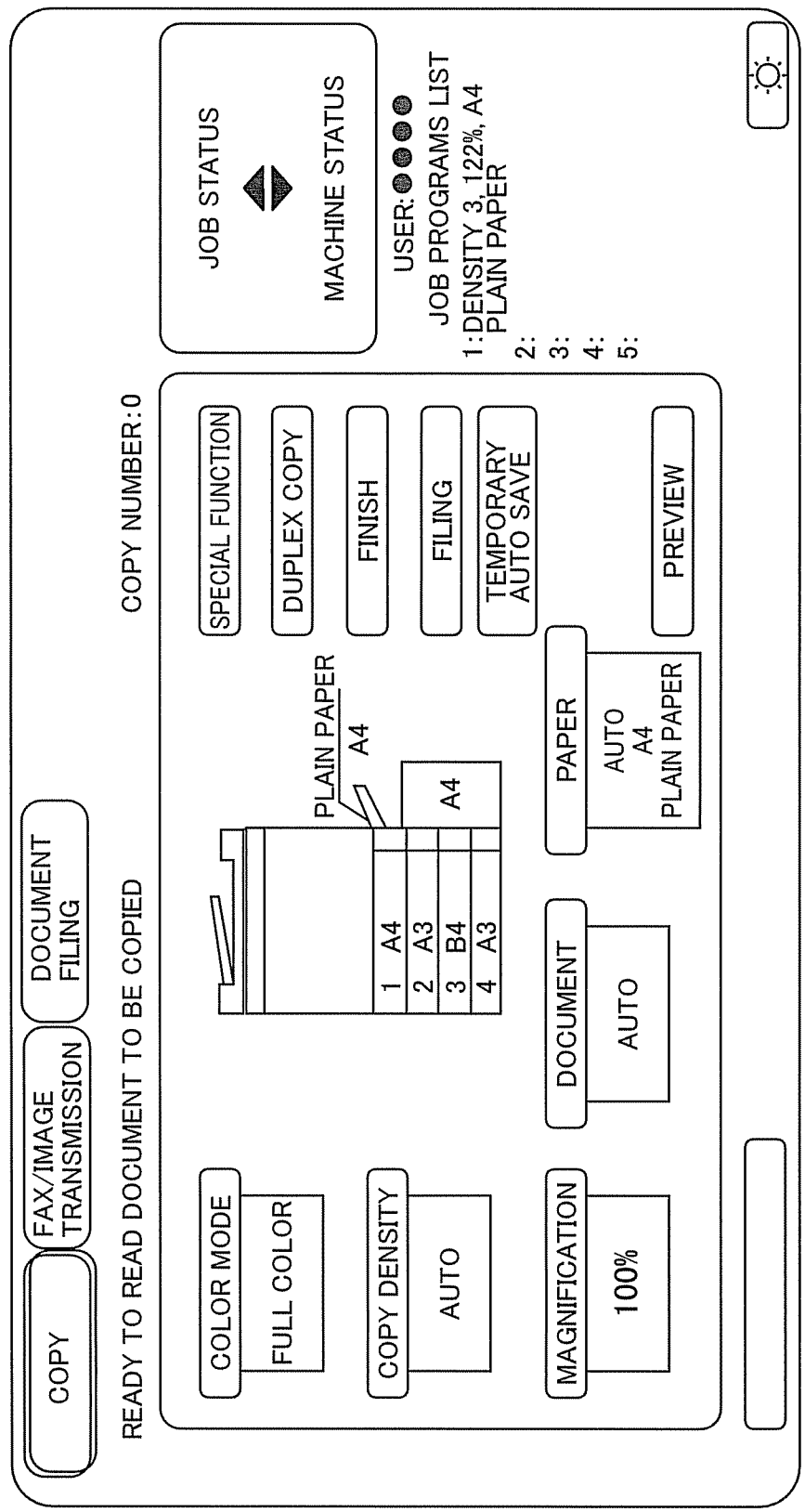

After such job program registration, when the same user logs in (S1000), a list of job programs registered in correspondence with the user is displayed, as shown in FIG. 12. If "1" of the job program on the exemplary image of FIG. 12 is pressed or "1" as the job program number is entered by using ten keys, the setting of "copy density" of level 3, "magnification" of 122% and "paper" of A4 size plain paper from manual feed tray is set in image forming apparatus 150. At this time, the display on touch-panel display 172 is switched to the image shown in FIG. 10, which shows the set contents.

As described above, in the image forming apparatus in accordance with the present embodiment, user operation history is stored and if the operation history satisfies any registration condition, the set contents are registered as a job program. The registration conditions include conditions which are considered convenient for the user if registered as job programs, and the conditions include: (1) an item on a deep layer is changed from the default value; (2) three or more items are changed from default values; (3) two or more items branched from different items on the first layer are changed; (4) the number of operation steps taken by the user for setting is larger than the number of operation steps typically required for the setting; and (5) an item, changing of whose default value requires switching among images on the touch-panel display, is changed. Therefore, if a job program is registered in accordance with the registration conditions, the trouble of user's setting task can significantly be reduced. While settings for the image forming apparatus are registered as job programs, unnecessary settings not useful for the user are not registered as job programs. As a result, only the useful settings can be registered without requiring troublesome registration operations by the user, and items on various and many menus of complicated configuration can be set easily, without necessitating troublesome operations by the user.

In the embodiment described above, job programs are different user by user. The present invention, however, is not limited to such an embodiment. A job program may be registered to be common to all users.

In the embodiment described above, an operation history that satisfies any of the basic registration conditions (conditions (1) to (5)) is regarded as a job program candidate. The present invention, however, is not limited to such an embodiment. Of these plurality of conditions, arbitrary ones may be combined and used as combined conditions. In that case, if the user operation history satisfies all basic registration conditions in the combined conditions, the image forming conditions at that time are registered as a job program.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
   an image forming unit forming an image on a medium based on image data;
   a first storage connected to said image forming unit, storing image forming conditions when said image forming unit forms an image;
   an input device receiving a user input setting said image forming conditions and storing set image forming conditions in said first storage;
   a second storage connected to said input device, storing a history of input operations by a user using said input device;
   a registering device, connected to said image forming unit, said first storage and said second storage, responsive to completion of image formation by said image forming unit, for comparing said history stored in said second storage with a predetermined condition for determining whether the image forming conditions stored in said first storage are to be registered and for registering, if said history satisfies the predetermined condition, the image forming conditions stored in said first storage as image forming conditions that can be called by a unique identifier; and
   a calling device, responsive to a user input designating said identifier, for calling the image forming conditions corresponding to the identifier from said registering device and having the image forming conditions stored in said first storage.

2. The image forming apparatus according to claim 1, wherein said predetermined condition is that any of a plurality of predetermined individual conditions is satisfied.

3. The image forming apparatus according to claim 1, wherein
   said input device includes
   a display device, and
   a setting device connected to said display device, presenting image forming conditions by said image forming unit in the form of a multi-layered menu, allowing setting by the user; and
   said registering device includes a device connected to said image forming unit, said first storage and said second storage, responsive to completion of image formation by said image forming unit, for registering, if an operation of setting an item on a layer deeper than a prescribed layer in said multi-layered menu is recorded in said history stored in said second storage, the image forming conditions stored in said first storage.

4. The image forming apparatus according to claim 1, wherein
   said input device includes
   an initial value setting device storing an initial value of each item of said image forming conditions, and
   a change input device receiving a user input of changing the value of an arbitrary item of said image forming conditions; and
   said predetermined condition is that the number of items whose initial values are changed by said change input device is not smaller than a prescribed number.

5. The image forming apparatus according to claim 1, wherein
   said input device includes
   a display device, and
   a setting device, connected to said display device, presenting image forming conditions by said image forming unit in the form of a multi-layered tree-type menu on said display device, allowing setting by the user moving among nodes in said menu; and
   said predetermined condition is that values of items in sub menus belonging to mutually different two nodes in a certain layer are set by said setting device.

6. The image forming apparatus according to claim 1, further comprising
   a comparing device comparing the number of actual operation steps by the user recorded in the user history stored in said second storage with the number of operation steps required for setting the image forming conditions stored in said first storage; wherein
   said predetermined condition is that said number of actual operation steps by the user is larger than said number of required operation steps.

7. The image forming apparatus according to claim 1, wherein
   said input device includes
   a display device, and
   an interactive input device receiving a user input for setting said image forming conditions by an interactive operation using said display device, and storing the set image forming conditions in said first storage;
   input by said interactive input device may require switching among a plurality of images displayed on said display device; and
   said predetermined condition is that a plurality of images are used in setting the image forming conditions by said interactive input device.

8. The image forming apparatus according to claim 1, further comprising a user identifying device that identifies a user using said image forming apparatus; wherein
   said predetermined condition related to said user operation is set user by user of said image forming apparatus.

9. The image forming apparatus according to claim 1, further comprising a user identifying device that identifies the user using said image forming apparatus; wherein said predetermined condition is set or changed by the user of said image forming apparatus.

10. The image forming apparatus according to claim 1, wherein
said registering device includes
a determining device connected to said image forming unit, said first storage unit and said second storage unit, responsive to completion of image formation by said image forming unit, for determining whether or not said history stored in said second storage satisfies a predetermined condition,
an instruction input unit provided to receive an output of said determining unit, responsive to positive determination by said determining device, for receiving a user instruction as to whether the image forming conditions stored in said first storage is to be registered or not, and
a device, responsive to an instruction to register from said instruction input device, for registering the image forming conditions stored in said first storage device as image forming conditions that can be called by a unique identifier.

11. The image forming apparatus according to claim 10, further comprising a user identifying device that identifies a user operating said image forming apparatus; wherein
said registering device includes a device, responsive to reception of an instruction to register from said instruction input device, for registering the image forming conditions stored in said first storage such that the image forming conditions can be called by a combination of an identifier of the user using said image forming apparatus and an identifier uniquely identifying the image forming conditions related to the user; and
said calling device includes a device, responsive to a user input designating the identifier of said image forming conditions, for calling the image forming conditions corresponding to the combination of the identifier and the identifier of the user operating said image forming apparatus from said registering device and storing in said first storage.

12. The image forming apparatus according to claim 1, further comprising a user identifying device that identifies a user operating said image forming apparatus; wherein
said registering device includes a device, connected to said image forming unit, said first storage unit and said second storage unit, responsive to completion of image formation by said image forming unit, for registering, if said history stored in said second storage satisfies a predetermined condition, the image forming conditions stored in said first storage such that the image forming conditions can be called by a combination of an identifier of the user using said image forming apparatus and an identifier uniquely identifying the image forming conditions related to the user; and
said calling device includes a device, responsive to a user input designating the identifier of said image forming conditions, for calling the image forming conditions corresponding to the combination of the identifier and the identifier of the user operating said image forming apparatus from said registering device and storing in said first storage.

13. The image forming apparatus according to claim 1, further comprising:
a log-in authentication device authorizing log-in of a user to said image forming apparatus;
a log-out detecting device detecting log-out of the user, whose log-in has been authorized by said log-in authentication device, from said image forming apparatus; and
a clearing device, connected to said log-out detecting device, responsive to detection of log-out of the user by said log-out detecting device, for clearing said second storage.

14. A method of operating an image forming apparatus, comprising the steps of:
receiving input of image data;
receiving and storing in a first storage user input related to setting of image forming conditions when an image is formed on a medium based on said image data;
storing a history of input operations by the user related to setting of said image forming conditions in a second storage;
forming, in responses to reception of a user instruction to form an image, an image based on said image data on a medium;
in response to completion of said image formation, comparing said history stored in said second storage with a predetermined condition for determining whether the image forming conditions stored in said first storage are to be registered and registering, if said history satisfies the predetermined condition, the image forming conditions stored in said first storage as image forming conditions that can be called by a unique identifier; and
calling, in response to a user input designating said identifier, the image forming conditions corresponding to the identifier from said registration device and storing the image forming conditions in said first storage.

15. A setting apparatus used connected to a prescribed functional unit, for setting operation conditions when said prescribed functional unit operates, comprising:
a first storage connectable to said functional unit, storing operation conditions when said functional unit operates;
an input device receiving a user input setting said operation conditions, and storing the set operation conditions in said first storage;
a second storage, connected to said input device, storing a history of input operations by the user using said input device;
a registering device, connected to said functional unit, said first storage and said second storage, responsive to completion of an operation by said functional unit, for comparing said history stored in said second storage with a predetermined condition for determining whether the image forming conditions stored in said first storage are to be registered and for registering, if said history satisfies the predetermined condition, the operation conditions stored in said first storage as operation conditions that can be called by a unique identifier; and
a calling device, responsive to a user input designating said identifier, for calling the operation conditions corresponding to the identifier and storing the operation conditions in said first storage.

16. The setting apparatus for setting operation conditions according to claim 15, wherein
said registering device includes
a determining device connected to said functional unit, said first storage unit and said second storage unit, responsive to completion of operation by said functional unit, for determining whether or not said history stored in said second storage satisfies a predetermined condition,
an instruction input unit provided to receive an output of said determining unit, responsive to positive determination by said determining device, for receiving a user instruction as to whether the operation conditions stored in said first storage is to be registered or not, and a device, responsive to an instruction to register from said instruction input device, for registering the operation conditions stored in said first storage device as operation conditions that can be called by a unique identifier.

17. The setting apparatus setting operation conditions according to claim 16, further comprising a user identifying device that identifies a user operating said functional unit; wherein said registering device includes a device, responsive to reception of an instruction to register from said instruction input device, for registering the operation conditions stored in said first storage such that the operation conditions can be called by a combination of an identifier of the user using said functional unit and an identifier uniquely identifying the operation conditions related to the user; and said calling device includes a device, responsive to a user input designating the identifier of said operation conditions, for calling the operation conditions corresponding to the combination of the identifier and the identifier of the user operating said functional unit from said registering device and storing in said first storage.

18. The setting apparatus for setting operation conditions according to claim 15, further comprising a user identifying device that identifies a user operating said functional unit; wherein said registering device includes a device, connected to said functional unit, said first storage unit and said second storage unit, responsive to completion of operation by said functional unit, for registering, if said history stored in said second storage satisfies a predetermined condition, the operation conditions stored in said first storage such that the operation conditions can be called by a combination of an identifier of the user using said functional unit and an identifier uniquely identifying the operation conditions related to the user; and said calling device includes a device, responsive to a user input designating the identifier of said operation conditions, for calling the operation conditions corresponding to the combination of the identifier and the identifier of the user operating said functional unit from said registering device and storing in said first storage.

19. The setting apparatus for setting operation conditions according to claim 15, further comprising:

a log-in authentication device authorizing log-in of a user to said functional unit;

a log-out detecting device detecting log-out of the user, whose log-in has been authorized by said log-in authentication device, from said functional unit; and a clearing device, connected to said log-out detecting device, responsive to detection of log-out of the user by said log-out detecting device, for clearing said second storage.

* * * * *